United States Patent
Kan et al.

(10) Patent No.: US 9,500,112 B2
(45) Date of Patent: Nov. 22, 2016

(54) EXHAUST GAS PURIFYING APPARATUS

(71) Applicant: Kabushiki Kaisha F.C.C., Hamamatsu (JP)

(72) Inventors: Kentaro Kan, Hamamatsu (JP); Kenji Ohashi, Hamamatsu (JP)

(73) Assignee: KABUSHIKI KAISHA F.C.C., Hamamatsu-Shi (JP)

( * ) Notice: Subject to any disclaimer, the term of this patent is extended or adjusted under 35 U.S.C. 154(b) by 439 days.

(21) Appl. No.: 14/021,966

(22) Filed: Sep. 9, 2013

(65) Prior Publication Data

US 2014/0010721 A1 Jan. 9, 2014

Related U.S. Application Data

(63) Continuation of application No. PCT/JP2012/056169, filed on Mar. 9, 2012.

(30) Foreign Application Priority Data

Mar. 10, 2011 (JP) ................................ 2011-052653

(51) Int. Cl.
*B01D 50/00* (2006.01)
*F01N 3/28* (2006.01)
(Continued)

(52) U.S. Cl.
CPC ......... *F01N 3/2842* (2013.01); *C04B 38/0083* (2013.01); *B01J 35/04* (2013.01); *B01J 37/0225* (2013.01); *C04B 2111/0081* (2013.01); *C04B 2111/00379* (2013.01); *F01N 3/2835* (2013.01); *F01N 3/2853* (2013.01); *Y10T 156/1038* (2015.01)

(58) Field of Classification Search
CPC .. F01N 3/2835; B01J 35/04; C04B 38/0083; C04B 2111/00379; Y10T 156/1038
USPC .......................................... 422/168, 177, 179
See application file for complete search history.

(56) References Cited

U.S. PATENT DOCUMENTS 3,074,839 A * 1/1963 Gorell .................. B31D 3/0276
156/197
4,588,443 A * 5/1986 Bache ................. B28B 23/0081
106/644

(Continued)

FOREIGN PATENT DOCUMENTS

JP   H10-216529    8/1998
JP   2003-293758   10/2003

(Continued)

*Primary Examiner* — Tom P Duong
(74) *Attorney, Agent, or Firm* — Knobbe Martens Olson & Bear LLP (57) ABSTRACT

An exhaust gas purifying apparatus which can reduce or prevent the shifting of a honeycomb catalyst member relative to a cushion member, even if hard vibrations are applied to the exhaust gas purifying apparatus, for example, during operation of a vehicle. In some embodiments, there can be no increase of the radial pressure of the cushion member applied to the honeycomb catalyst member. In some embodiments, an exhaust gas purifying apparatus can comprise a honeycomb catalyst member carrying metallic catalyst, wherein the member can be contained in a cylindrical container via a cushion member. The catalyst structural member can be formed of a sheet-like catalyst structure and can be manufactured by a wet paper-making method. The structural member can be secured to the cushion member by press-fitting the structural member into the cushion member.

17 Claims, 7 Drawing Sheets

(51) Int. Cl.
*C04B 38/00* (2006.01)
*B01J 35/04* (2006.01)
*B01J 37/02* (2006.01)
*C04B 111/00* (2006.01)

(56) References Cited

U.S. PATENT DOCUMENTS

| | | | |
|---|---|---|---|
| 5,073,432 A | 12/1991 | Horikawa et al. | |
| 5,736,109 A | 4/1998 | Howorth et al. | |
| 7,052,532 B1* | 5/2006 | Liu | B01D 39/2075 55/520 |
| 2003/0165638 A1 | 9/2003 | Louks et al. | |
| 2004/0156760 A1 | 8/2004 | Watanabe | |
| 2005/0232830 A1 | 10/2005 | Bruck | |
| 2007/0004592 A1 | 1/2007 | Ohno | |
| 2007/0292318 A1 | 12/2007 | Andoh et al. | |
| 2008/0250775 A1 | 10/2008 | Bruck | |
| 2008/0289307 A1 | 11/2008 | Ogyu et al. | |
| 2009/0042721 A1 | 2/2009 | Morisaka et al. | |
| 2009/0148356 A1* | 6/2009 | Okabe | F01N 3/2853 422/179 |
| 2013/0260088 A1* | 10/2013 | David | B32B 3/12 428/116 |

FOREIGN PATENT DOCUMENTS

| | | |
|---|---|---|
| JP | 2004-290899 | 10/2004 |
| JP | 2009-006312 | 1/2009 |
| JP | 2009-172522 | 8/2009 |

* cited by examiner

EXHAUST GAS PURIFYING APPARATUS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD OF THE INVENTION

The present disclosure relates to exhaust gas purifying apparatuses such as those including a honeycomb catalyst member carrying a metallic catalyst. The catalyst member can be contained in a cylindrical container and surrounded by a cushion member.

DESCRIPTION OF THE RELATED ART

Exhaust gas purifying apparatuses for purifying exhaust gas discharged from an engine of a vehicle usually comprise a honeycomb catalyst member carrying a noble metal catalyst such as platinum, rhodium, palladium, or other noble metals. The honeycomb catalyst member typically is secured within a cylindrical metallic container (made of stainless steel) and adapted to be mounted in a muffler or an exhaust pipe of a vehicle. Metals and ceramics have been mainly used to form the honeycomb catalyst member of the exhaust gas purifying apparatus.

When using a ceramic honeycomb catalyst member having a honeycomb structure, however, thermal stress can occur between the contact surface of the honeycomb catalyst member and the container of stainless steel as the coefficient of thermal expansion of ceramic is extremely small as compared of the stainless steel. One method that has been proposed for reducing thermal stress in an exhaust gas purifying apparatus, for example in Japanese Application No. JP 02-43955 A, includes a ceramic honeycomb catalyst member press-fit into the metallic container of stainless steel via a cushion member.

However, in the exhaust gas purifying apparatus of Japanese Application No. JP 02-43955 A, the honeycomb catalyst member could be displaced in the press-fitted direction (the axial direction of the honeycomb catalyst member) relative to the cushion member when hard vibrations are applied to the exhaust gas purifying apparatus from a body of a vehicle, for example, during operation of the vehicle. That is, since the ceramic honeycomb catalyst member usually has a smaller surface roughness and thus lower frictional resistance relative to the cushion member, the position of the honeycomb catalyst member could be displaced relative to the cushion member when hard vibrations are applied to them.

Accordingly, one method to overcome the displacement is to apply a large radial pressure to the honeycomb catalyst member by the cushion member in order for the catalyst not to be displaced relative to the cushion member by hard vibrations caused by a vehicle. However, there are problems with this approach as the honeycomb catalyst member would be required to have high strength and be sufficiently durable against the large radial pressure applied by the cushion member. This approach would mean that the press-fitting operation of the honeycomb catalyst member into the container would be difficult.

SUMMARY

Aspects of the present disclosure provide an exhaust gas purifying apparatus which can reduce or prevent the shifting of a honeycomb catalyst member relative to a cushion member, even if hard vibrations are applied to the exhaust gas purifying apparatus during the operation of a vehicle. For example, in some embodiments, such reduction or prevention of shifting can be achieved without increasing the radial pressure that the cushion member applies to the honeycomb catalyst member.

In some embodiments, an exhaust gas purifying apparatus can be formed comprising a honeycomb catalyst member carrying a metallic catalyst, wherein the honeycombed catalyst member can be contained in a cylindrical container via a cushion member. The catalyst structural member can be formed of a sheet-like catalyst structure made by a wet paper-making method, and can be secured to the cushion member by being press-fit into the cushion member.

In some embodiments, a contacting surface of the honeycomb catalyst member can be in contact with the cushion member, and the contacting surface can have a fiber flow orientation substantially orthogonal to a press-fitting direction of the honeycomb catalyst member into the cushion member.

In some embodiments, the honeycomb catalyst member can be formed by baking a sheet-like catalyst structure made by a wet paper making method. The sheet-like catalyst structure can be made from flock obtained by adding flocculant to a slurry formed from water mingled with fibers and binder, wherein the fiber flow orientation can be formed during the paper-making process of the sheet-like catalyst structure.

In some embodiments, the honeycomb catalyst member can have a honeycomb structure formed by adhering a corrugated sheet-like catalyst structure onto at least one surface of a flat sheet-like catalyst structure, and then by winding the corrugated and flat sheet-like catalyst structures into a roll.

In some embodiments, since the catalyst structural member can be formed of a sheet-like catalyst structure made by a wet paper-making method and secured to the cushion member by being press-fit into it, it is possible to prevent the shift of position of the honeycomb catalyst member relative to the cushion member even if hard vibrations are applied to the exhaust gas purifying apparatus during operation of a vehicle without increasing the radial pressure that the cushion member applies to the honeycomb catalyst member.

In some embodiments, since a contacting surface of the honeycomb catalyst member contacting with the cushion member has a fiber flow orientation substantially orthogonal to the press-fitting direction of the honeycomb catalyst member into the cushion member, it is possible to increase the frictional resistance in the press-fitting direction between the honeycomb catalyst member and the cushion member and thus to prevent the shift of position of the honeycomb catalyst member relative to the cushion member even if hard vibrations are applied to the exhaust gas purifying apparatus during operation of a vehicle without increasing the radial pressure that the cushion member applies to the honeycomb catalyst member.

In some embodiments, since the honeycomb catalyst member can be formed by baking the sheet-like catalyst structure made by the wet paper making method from a flock obtained by adding flocculant to slurry formed of water mingled with fibers and binder, and wherein the fiber flow orientation is formed during the paper-making process of the sheet-like catalyst structure, it is possible to more easily manufacture the honeycomb catalyst member in which the fiber flow orientation is formed in a direction substantially orthogonal to the press-fitting direction into the cushion member.

In some embodiments, since the honeycomb catalyst member has a honeycomb structure formed by adhering a corrugated sheet-like catalyst structure onto at least one surface of a flat sheet-like catalyst structure and then by winding up them to a roll, it is also possible to more easily manufacture the honeycomb catalyst member in which the fiber flow orientation is formed in a direction substantially orthogonal to the press-fitting direction into the cushion member.

DETAILED DESCRIPTION

Several embodiments of the present disclosure are described more in detail below with reference to accompanied drawings.

The embodiments of exhaust gas purifying apparatuses disclosed herein can be mounted within a muffler or exhaust pipe of a vehicle for purifying exhaust gas. However, other configurations can also be used. The apparatus can comprise a hollow cylindrical container 1, a hollow cylindrical cushion member 2, and a solid cylindrical honeycomb catalyst member 3. In some embodiments, the catalyst member 3 can be filled with a honeycomb catalyst.

In some embodiments, container 1 can be a cylindrical member. In some embodiments, container 1 can be metallic and formed from, for example, stainless steel, although other materials can be used. Its outer circumferential surface can be in contact with an inner surface of a muffler or exhaust pipe of a vehicle, and can be secured thereto. Further, its inner circumferential surface can be in contact with an outer circumferential surface 2a (see FIG. 3) of a cushion member 2 for containment of the cushion member 2. That is, the container 1 can form a casing for the exhaust gas purifying apparatus, and can contain the cushion member 2 and the honeycomb catalyst member 3.

Figure 2:
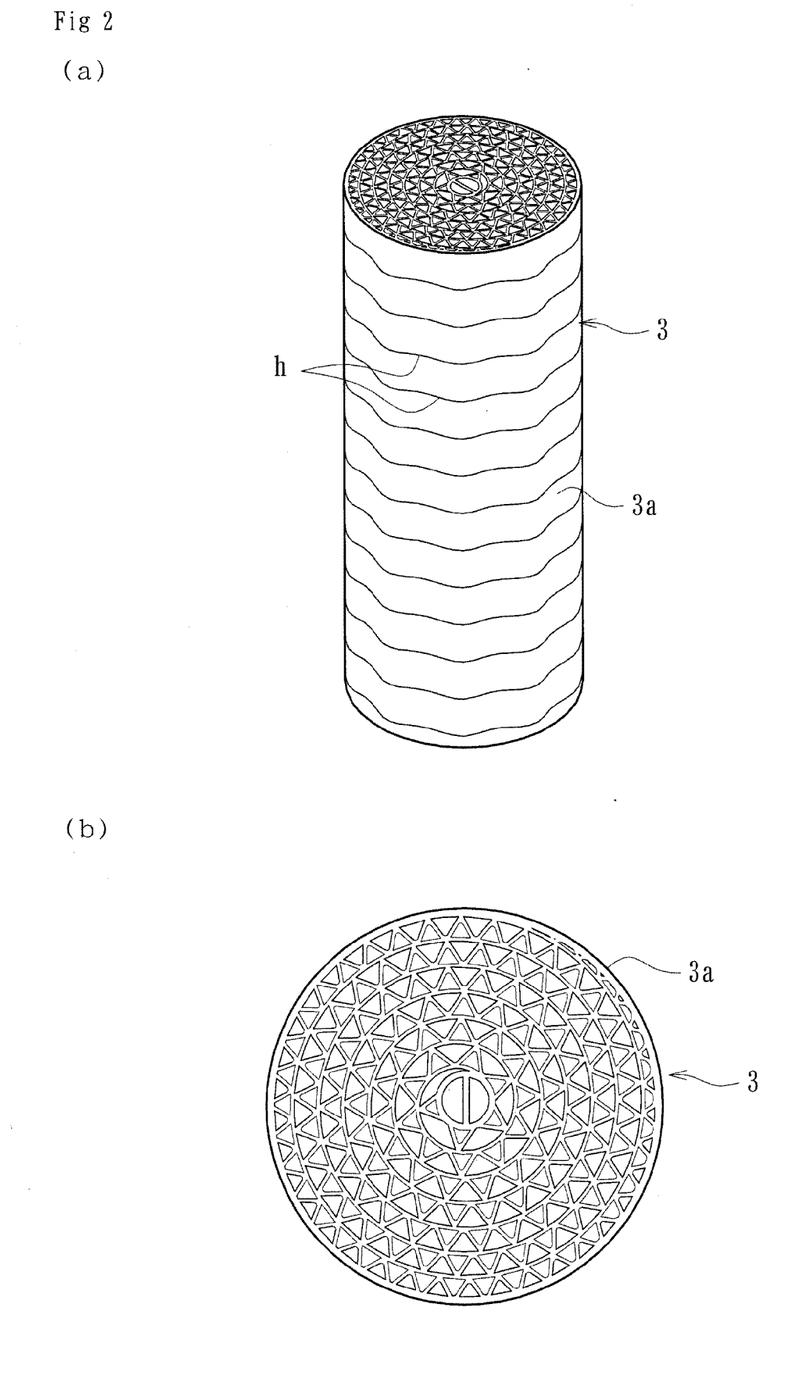
FIGS. 2A-B illustrate a schematic perspective view (A) and a plan view (B) showing an embodiment of a honeycomb catalyst member used in an exhaust gas purifying apparatus of the present disclosure.
Figure 3:
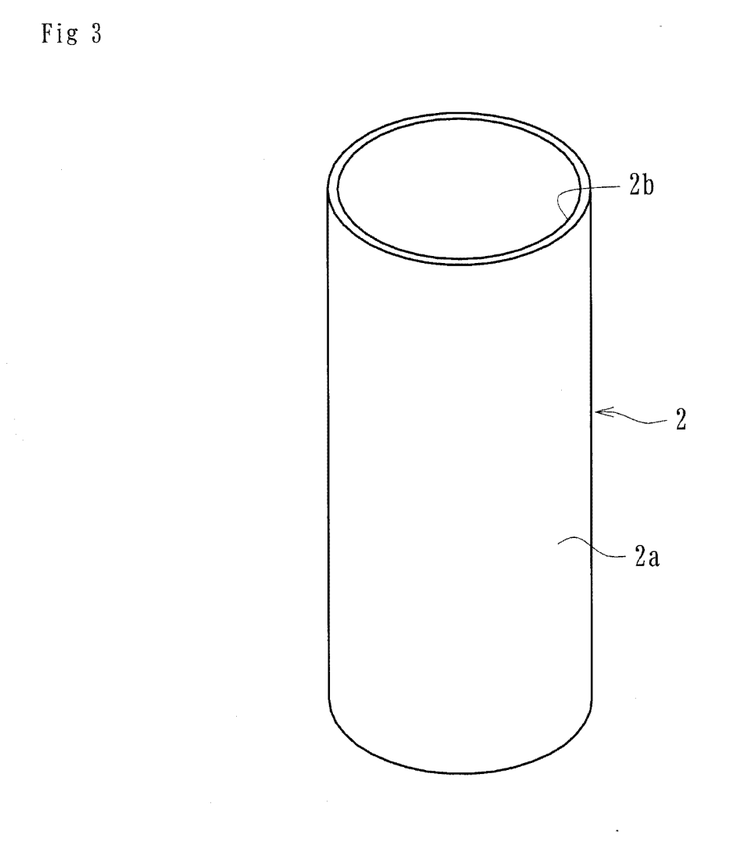
FIG. 3 illustrates a perspective view showing an embodiment of a cushion member of an exhaust gas purifying apparatus.

As shown in FIG. 3, in some embodiments the cushion member 2 can be formed of cylindrical unwoven material comprising 70% alumina fibers and 30% silica fibers. The cushion member 2 can be interposed between the container 1 and the honeycomb catalyst member 3. In some embodiments, container 1 can have an outer circumferential surface 2a which can be in contact with the inner circumferential surface of the container 1. The cushion member 2 can have an inner circumferential surface 2b which can be in contact with the outer circumferential surface 3a (see FIG. 2) of the honeycomb catalyst member 3.

Figure 5:
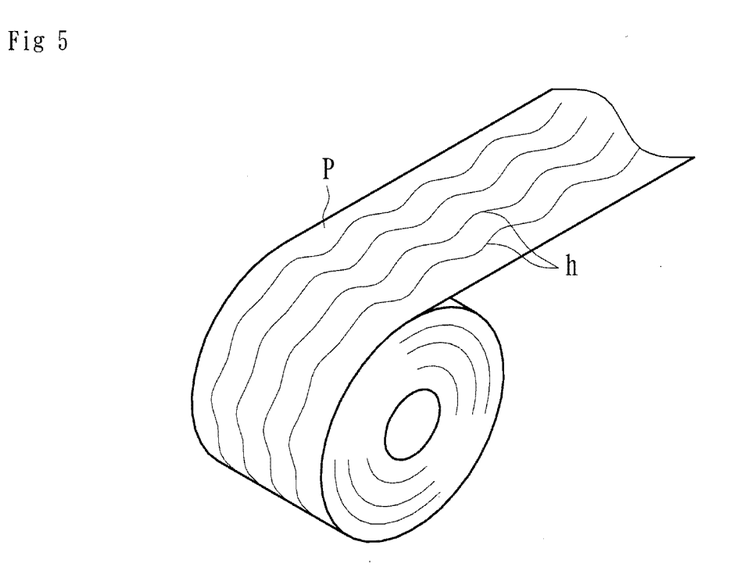
FIG. 5 illustrates a schematic view showing an embodiment of a winding-up step of a sheet-like catalyst structure used for making a honeycomb catalyst member.

The honeycomb catalyst member 3 can be formed of a sheet-like (e.g. paper-like) catalyst structure which can be made by a wet paper-making method (e.g. an "outturn machining method"), then wound into a roll as shown in FIG. 2. After winding, the catalyst member 3 can have a solid cylindrical configuration. In some embodiments, after winding, the catalyst member 3 can be filled with honeycomb catalyst. The catalyst member 3 can then be press-fit into the cushion member 2. In some embodiments, a fiber flow orientation "h" (see FIGS. 2 (*a*) and 5) can be formed on the surface of the catalyst member 3 in contact with the cushion member 2 (i.e. outer circumferential surface 3a of the honeycomb catalyst member 3). The fiber flow orientation can be in a direction substantially orthogonal to the press-fitting direction (i.e. axial direction) of the honeycomb catalyst member 3 into the cushion member 2.

Figure 7:
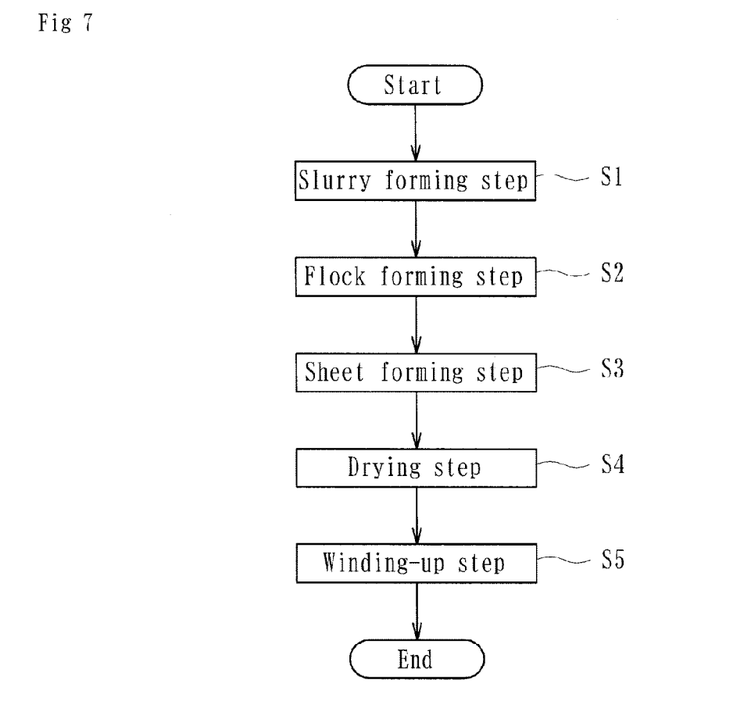
FIG. 7 illustrates a flowchart showing embodiments of manufacturing steps of a honeycomb catalyst member used in an exhaust gas purifying apparatus.

A method for manufacturing an embodiment of the sheet-like catalyst structure 3 of the present disclosure is described with reference to a flowchart of FIG. 7.

First, in some embodiments, an aqueous solution can be prepared by adding ceramic powder, fibers (such as heat resisting fibers) including, for example, alumina-silica fibers, catalyst powder, inorganic binder and pore controlling agent into water to form slurry in which said additives can be uniformly dispersed (slurry forming step S1). Then, flock can be formed by adding flocculant to the slurry (flock forming step S2) and a sheet-like (e.g. paper-like) porous structure can formed (sheet forming step S3) by paper making the flock (e.g. wet paper-making method).

The heat resisting fibers can comprise an amorphous ceramic formed by silica and alumina as main components and can be formed into a sheet-like configuration by the wet paper-making method, thereby forming the honeycomb catalyst member 3. Other heat resisting fiber materials, for example organic fibers such as Aramid fibers, may be used if they are chemically and physically stable and able to form into a high strong structure of entangled fibers in the paper-making step. In addition, the paper-like catalyst structure can be formed using glass fibers or carbon fibers having high heat resistance and chemically and physically stable properties by the wet paper-making method.

A metallic catalyst powder, for example carrying metallic oxides, can be uniformly dispersed in pores of porous material, and can adhere to the pores during the wet paper-making method. In some embodiments, noble metals such as, for example, platinum, rhodium, or palladium can be used as metallic catalyst powder to reduce, for example, NO contained in the exhaust gas to $N_2$, and thus to purify the exhaust gas. Other purification reductions can be performed as well, and are not limiting.

The adhesion of metallic catalyst powder to pores of the porous material can be performed through the use of an inorganic binder. In general, the inorganic binders can be a bound material formed from heat resisting fibers and metallic catalyst, and can be classified as one of two kinds of inorganic binders; one of which can be material adapted to be bound by melting, such as glass, the other of which can be material strengthened by chemical binding due to dehydrating response and sintering, such as colloidal inorganic oxides or silica gel. In particular, colloidal silica, colloidal alumina, and/or colloidal zirconia can be used due to their dispersibility and high strength. In some embodiments, the latter can be used as an inorganic binder in the present disclosure.

The flocculant used for forming the flock can include high-molecular flocculant and a metallic cation, where the flocculant can have a strong electric charge. Thus, the flocculant can neutralize the electric charges in an aqueous solution of fibers which are separated from each other by repulsive forces, and can force the fibers to be entangled. The high-molecular flocculant can penetrate into spaces between fibers and acts to increase the binding force. Alum, aluminum sulfate, or other materials containing $Al^{3+}$ cations in an aqueous solution can be used as metallic cations.

Figure 4:
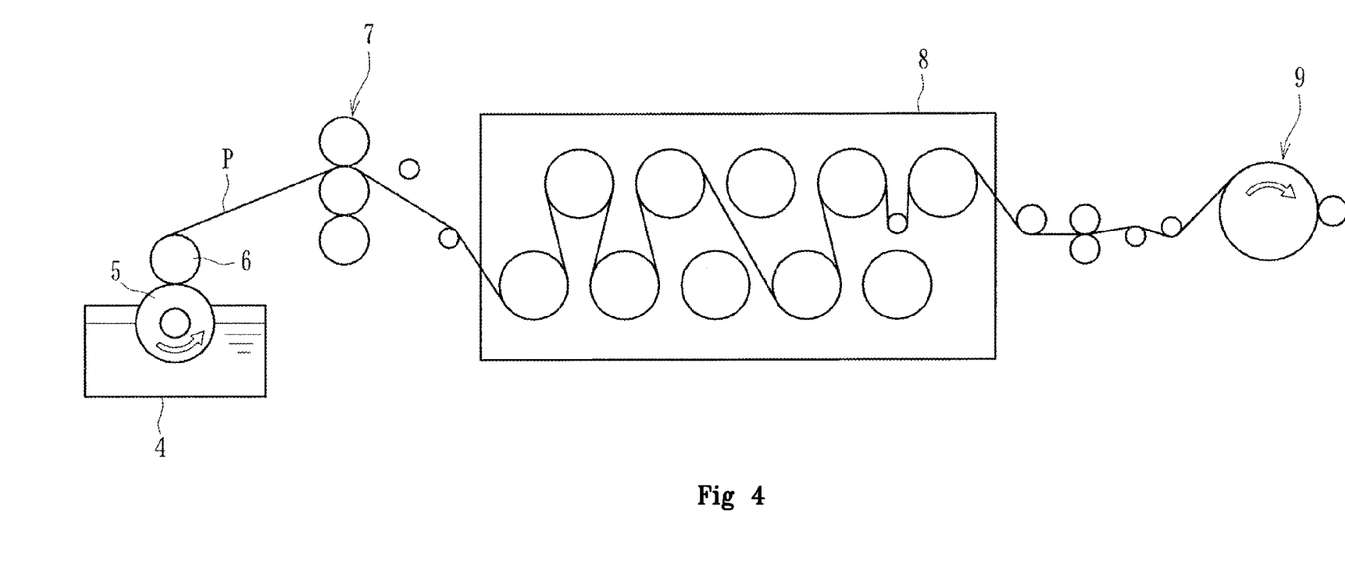
FIG. 4 illustrates a schematic view showing embodiments of manufacturing steps of a sheet-like catalyst structure used for making a honeycomb catalyst member.

According to the present disclosure, a thickness of the sheet-like catalyst structure P can be manufactured, as shown in FIG. 4, by containing said flock, including fibers and binder (flock formed via the slurry forming step S1 and flock forming step S2), in a containing tank 4, and by ladling out liquid in the tank 4 using a cylinder mould 5 (e.g. a cylindrical mesh member for transferring constant amount of slurry to a roller 6) rotated at a position near the liquid level. This sheet-like catalyst structure P can be continuously transferred from the roller 6 to a roll press 7 and adjusted to a desired thickness by applying a predetermined pressure using the roll press 7.

The sheet-like catalyst structure P can be pressed by the roll press 7 into a thickness, and can be continuously fed to a drying machine 8 and dried during transference therethrough (drying step S4). The dried sheet-like catalyst structure P can then be continuously wound up by a winding-up machine 9, as shown in FIGS. 4 and 5 (winding-up step S5). Thus an amount of the sheet-like catalyst structure P can be obtained. This sheet-like catalyst structure P can then be formed into a honeycomb catalyst member 3 having porous structure by forming the sheet-like catalyst structure P into a honeycomb structure in a way described below, and then by baking catalyst member 3. The noble metal acting as catalyst metal can be kept in a carried condition in pores of the sheet-like catalyst structure P.

According to the present disclosure, the fiber flow orientation "h" can be formed during the paper-making steps (in particular, steps from the paper-making step by the cylinder mould 5 to the winding-up step by the winding-up machine 9) of the sheet-like catalyst structure P. That is, since the fibers can be oriented to the transferring direction during the paper-making steps, the fiber flow orientation "h" can be naturally formed as shown in FIG. 5. In the present disclosure, the term "fiber flow orientation" means a specific direction of fibers, in particular the transferring direction (feeding direction) of the sheet-like catalyst structure P.

Figure 6:
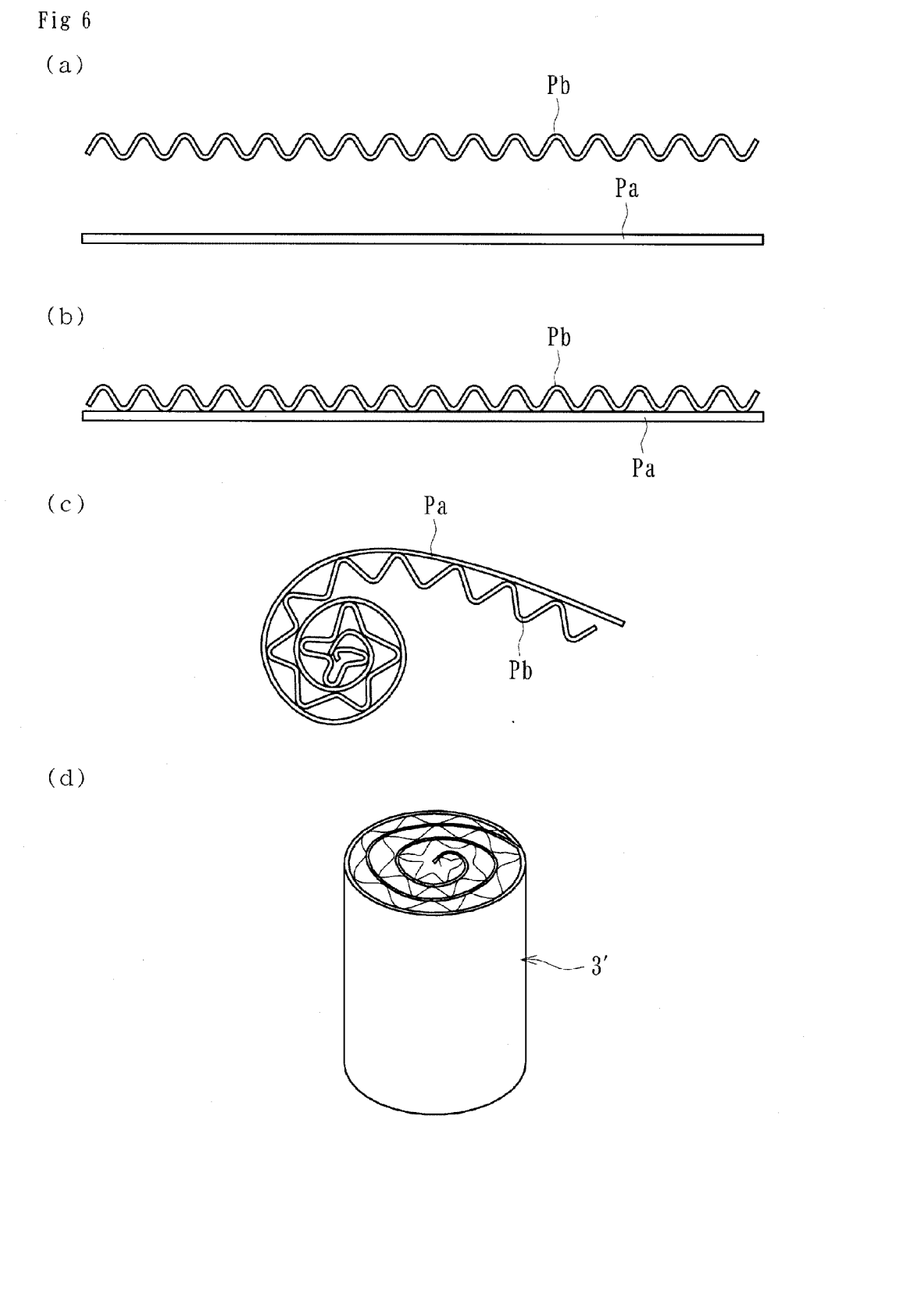
FIGS. 6A-D illustrate schematic views showing embodiments of manufacturing steps of a honeycomb catalyst member used in an exhaust gas purifying apparatus.

As shown in FIG. 6(a), the sheet-like catalyst structure P wound by the winding-up machine 9 and can be prepared into two kinds of sheets; one being a straight sheet-like catalyst structure Pa and the other being a corrugated sheet-like catalyst structure Pb. The corrugated sheet-like structure Pb can be adhered by an adhesive, or other means, to at least one surface of the straight sheet-like structure Pa, as shown in FIG. 6(b). Then, adhered sheet-like structures Pa, Pb can be wound as shown in FIG. 6(c) to form a pre-baking honeycomb catalyst member 3' (FIG. 6(d)).

Figure 1:
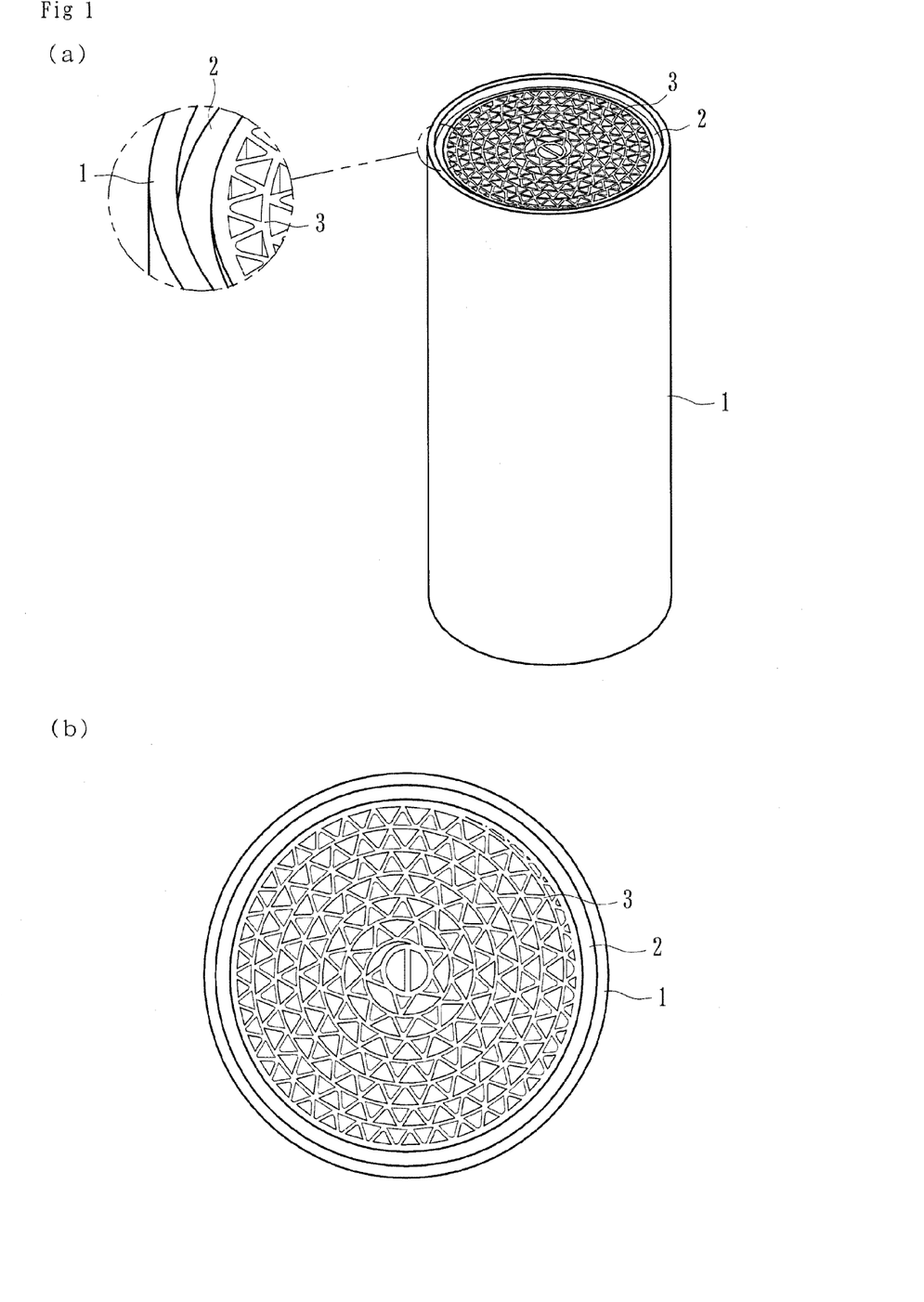
FIGS. 1A-B illustrate a schematic perspective view (A) and a plan view (B) showing an embodiment of an exhaust gas purifying apparatus in accordance with the present disclosure.

The honeycomb catalyst member 3 (FIG. 2) can be obtained by baking the pre-baking honeycomb catalyst member 3' e.g. at a temperature of about 1450-1550° C. The honeycomb catalyst member 3 can be finished through a series of further manufacturing steps. The honeycomb catalyst member 3 can then be press-fit into the cushion member 2 previously contained in the container 1, thereby forming the exhaust gas purifying apparatus as shown in FIG. 1. Thus, the honeycomb catalyst member 3 can have a fiber flow orientation "h" formed on its outer circumferential surface 3a that can be closely fitted on and contacted with the inner circumferential surface 2b of the cushion member 2.

Figure 8:
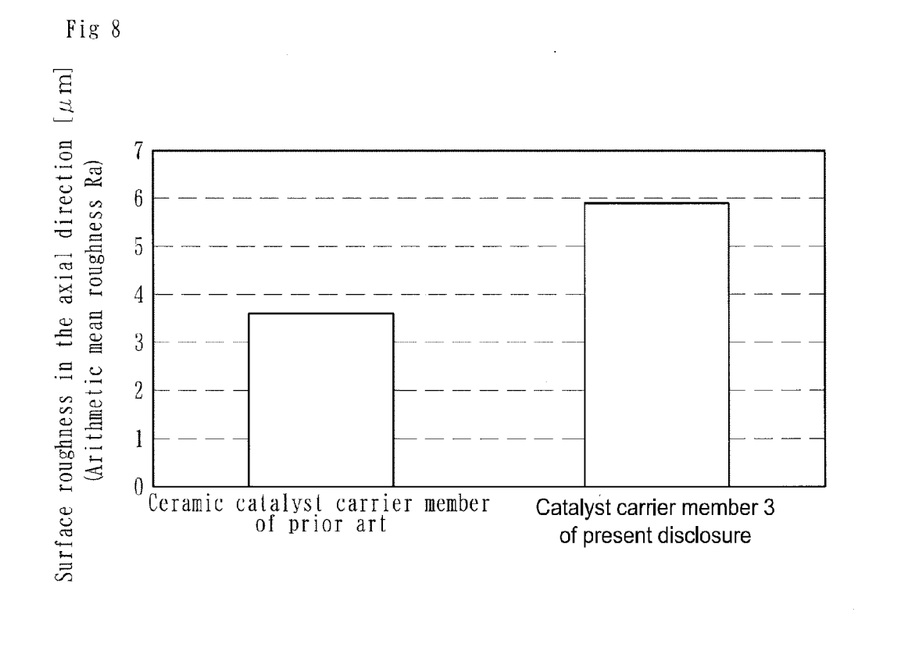
FIG. 8 illustrates a graph for comparing the surface roughness in an axial direction of a honeycomb catalyst member of an embodiment of the present disclosure and that of ceramics of the prior art.

FIG. 8 shows comparative results of the surface roughness in the axial direction (direction substantially orthogonal to the press-fitting direction) of an embodiment of a honeycomb catalyst member 3 manufactured in accordance with the present disclosure and a ceramic honeycomb catalyst member of the prior art. As shown in FIG. 8, the surface roughness in the axial direction of the honeycomb catalyst member 3 is about 5.916 (μm) (right side in FIG. 8) and on the other hand, that of the ceramic honeycomb catalyst member of the prior art is about 3.576 (μm) (left side in FIG. 8). As can be seen from the results, the surface roughness in the axial direction of the honeycomb catalyst member 3 is larger than that of the ceramic honeycomb catalyst member of the prior art.

According to the present disclosure, since the honeycomb catalyst member 3 can be formed of the sheet-like catalyst structure P made by the wet paper-making method and can be press-fit into the cushion member 2, it is possible to increase the frictional resistance between the honeycomb catalyst member 3 and the cushion member 2. Thus, it is possible to prevent the shift of position of the honeycomb catalyst member 3 relative to the cushion member 2 even if hard vibrations would be applied to the exhaust gas purifying apparatus during operation of a vehicle without increasing the radial pressure that the cushion member 2 applies to the honeycomb catalyst member 3.

According to the present disclosure, since the honeycomb catalyst member 3 can be formed of the sheet-like catalyst structure P made by the wet paper-making method producing the fiber flow orientation "h" substantially orthogonal to the press-fitting direction of the honey comb catalyst member 3, it is possible to increase the frictional resistance between the honeycomb catalyst member 3 and the cushion member 2. Thus, it is possible to prevent the shift of position of the honeycomb catalyst member 3 relative to the cushion member 2 even if hard vibrations would be applied to the exhaust gas purifying apparatus during operation of a vehicle without increasing the radial pressure that the cushion member 2 applies to the honeycomb catalyst member 3.

In addition, since the honeycomb catalyst member 3 can be manufactured by baking the rolled sheet-like catalyst structure P formed by paper-making the flock prepared from the slurry formed by a predetermined amount of water mingled with predetermined fibers and binder and added by flocculant, it is possible to easily obtain the honeycomb catalyst member 3 in which the fiber flow orientation "h" is formed in the direction substantially orthogonal to the press-fitting direction of the honeycomb catalyst member 3 relative to the cushion member 2. Especially since the fiber flow orientation "h" can be naturally formed during transfer of the sheet-like catalyst structure P in the paper-making process, it is possible to suppress the manufacturing cost without necessity of a separate step for forming the fiber flow orientation.

Furthermore, since the honeycomb catalyst member 3 can have a honeycomb structure formed by adhering a corrugated sheet-like catalyst structure Pb onto at least one surface of a flat sheet-like catalyst structure Pa and then by winding up them to a roll, it is also possible to more easily manufacture the honeycomb catalyst member 3 in which the fiber flow orientation "h" is formed in a direction substantially orthogonal to the press-fitting direction into the cushion member 2. The honeycomb structure can enable the exhaust gas to smoothly flow through the honeycomb catalyst member 3, and thus to perform the exhaust gas purification action.

The present disclosure has been described with reference to several embodiments. Obviously, modifications and alternations will be occur to those of ordinary skill in the art upon reading and understanding the preceding detailed description. It is intended that the present disclosure be construed as including all such alternations and modifications insofar as they come within the scope of the appended claims or the equivalents thereof.

For example, a honeycomb catalyst member formed by the wet paper-making method but not formed with the fiber flow orientation may be press-fit into the cushion member 2, or a honeycomb catalyst member formed with a fiber flow orientation in the press-fitting direction or in a direction deviated from the press-fitting direction may be used. That is, since the honeycomb catalyst member comprises a sheet-like catalyst structure manufactured by the wet paper-making method, a large frictional resistance can be created between the honeycomb catalyst member and the cushion member 2 by fibers present on the surface of the honeycomb catalyst member. Although it has been described that the fiber flow orientation "h" is formed during the paper-making process (in particular the transfer of the sheet-like catalyst structure P), it is possible to form the fiber flow orientation "h" in other process other than the paper making process.

The present disclosure can be applied to other types of exhaust gas purifying apparatus than that for a vehicle so long as the honeycomb catalyst member comprises a sheet like catalyst structure made by the wet paper-making method and the honeycomb catalyst member is press-fitted into the cushion member.

What is claimed is:

1. An exhaust gas purifying apparatus comprising:
a honeycomb catalyst member carrying a metallic catalyst, wherein the catalyst member is contained in a cylindrical container via a cushion member;
wherein the catalyst structural member is formed of a sheet-like catalyst structure made by a wet paper-making method;
wherein the catalyst structural member is secured to the cushion member by press-fitting the structural member into the cushion member; and
wherein a contacting surface of the honeycomb catalyst member in contact with the cushion member has a fiber flow orientation substantially orthogonal to the press-fitting direction of the honeycomb catalyst member into the cushion chamber.

2. An exhaust gas purifying apparatus of claim 1, wherein the honeycomb catalyst member is formed by baking the sheet-like catalyst structure made by the wet paper making method from a flock obtained by adding flocculant to slurry formed of water mingled with fibers and binder, and wherein the fiber flow orientation is formed during the paper-making process of the sheet-like catalyst structure.

3. An exhaust gas purifying apparatus of claim 2, wherein the honeycomb catalyst member has a honeycomb structure formed by adhering a corrugated sheet-like catalyst structure onto at least one surface of a flat sheet-like catalyst structure and then by winding up them to a roll.

4. An exhaust gas purifying apparatus of claim 1, wherein the cushion member is generally cylindrical.

5. An exhaust gas purifying apparatus of claim 1, wherein the cylindrical container comprises stainless steel.

6. An exhaust gas purifying apparatus of claim 1, wherein the cylindrical container is configured to be in contact with an inner surface of a muffler or exhaust pipe of a vehicle.

7. An exhaust gas purifying apparatus of claim 1, wherein the cushion member comprises alumina fibers and silica fibers.

8. An exhaust gas purifying apparatus of claim 7, wherein the cushion member comprises 70% alumina fibers and 30% silica fibers.

9. An exhaust gas purifying apparatus of claim 1, wherein the cushion member comprises Aramid fibers.

10. An exhaust gas purifying apparatus of claim 1, wherein the metallic catalyst comprises metallic oxides.

11. An exhaust gas purifying apparatus of claim 1, wherein the metallic catalyst comprises noble metals.

12. An exhaust gas purifying apparatus of claim 1, wherein the metallic catalyst adheres to the honeycomb catalyst member by an inorganic binder.

13. An exhaust gas purifying apparatus of claim 12, wherein the inorganic binder comprises colloidal inorganic oxides or silica gel.

14. An exhaust gas purifying apparatus of claim 13, wherein the colloidal inorganic oxides comprise colloidal silica, colloidal alumina, or combinations thereof.

15. An exhaust gas purifying apparatus of claim 1, wherein the honeycomb catalyst member comprises a metallic cation.

16. An exhaust gas purifying apparatus of claim 15, wherein the metallic cation comprises $Al^{3+}$.

17. An exhaust gas purifying apparatus of claim 1, wherein the honeycomb catalyst member has a surface roughness of at least 5.916 μm.

* * * * *

UNITED STATES PATENT AND TRADEMARK OFFICE
CERTIFICATE OF CORRECTION

PATENT NO. : 9,500,112 B2  
APPLICATION NO. : 14/021966  
DATED : November 22, 2016  
INVENTOR(S) : Kentaro Kan It is certified that error appears in the above-identified patent and that said Letters Patent is hereby corrected as shown below:

In Column 4 at Line 60, Change "NO" to --$NO_X$--.

Signed and Sealed this  
Twenty-fifth Day of April, 2017

Michelle K. Lee  
*Director of the United States Patent and Trademark Office*